US009338745B2

(12) United States Patent
Zhang

(10) Patent No.: US 9,338,745 B2
(45) Date of Patent: May 10, 2016

(54) METHOD AND SYSTEM FOR NETWORK HANDOVER

(75) Inventor: Ke Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 222 days.

(21) Appl. No.: 13/885,397

(22) PCT Filed: Feb. 3, 2011

(86) PCT No.: PCT/CN2011/071465
§ 371 (c)(1),
(2), (4) Date: May 15, 2013

(87) PCT Pub. No.: WO2012/065382
PCT Pub. Date: May 24, 2012

(65) Prior Publication Data
US 2013/0229967 A1 Sep. 5, 2013

(30) Foreign Application Priority Data

Nov. 15, 2010 (CN) .......................... 2010 1 0546362

(51) Int. Cl.
H04W 36/00 (2009.01)
H04W 52/02 (2009.01)
(Continued)

(52) U.S. Cl.
CPC ...... *H04W 52/0225* (2013.01); *H04W 36/0066* (2013.01); *H04W 52/0238* (2013.01); *H04W 36/14* (2013.01); *H04W 76/046* (2013.01); *Y02B 60/50* (2013.01)

(58) Field of Classification Search
USPC .......... 370/311, 331, 341; 455/436, 572, 573, 455/574
See application file for complete search history.

(56) References Cited

U.S. PATENT DOCUMENTS

2007/0067734 A1* 3/2007 Cunningham et al. ........ 715/779
2008/0113665 A1 5/2008 Paas et al.
2009/0016296 A1 1/2009 Jechoux et al.
(Continued)

FOREIGN PATENT DOCUMENTS

| CN | 101102585 | 1/2008 |
| CN | 101312595 | 11/2008 |

(Continued)

OTHER PUBLICATIONS

ISR and IPRP for related PCT/CN2011/071465 mailed on Aug. 11, 2011 and issued on May 21, 2013 and its English translations.
(Continued)

*Primary Examiner* — Edan Orgad
*Assistant Examiner* — Saumit Shah
(74) *Attorney, Agent, or Firm* — Ladas & Parry, LLP

(57) ABSTRACT

The disclosure provides a method and a system for network handover. The method includes: during a process that equipment hands over from a current network to another network, a driver receiving a network-disconnected message, and judging whether the network-disconnected message is sent from a Connection Manager (CM); if the network-disconnected message is sent from the CM, the driver reporting, to an operating system, a first signalling which identifies that the current network is disconnected; and if the network-disconnected message is not sent from the CM, the driver reporting, to the operating system, a second signalling which identifies that the current network is connected. By the adoption of the method and the system, power consumption of the equipment can be reduced.

11 Claims, 3 Drawing Sheets

(51) Int. Cl.
*H04W 36/14* (2009.01)
*H04W 76/04* (2009.01)

(56) References Cited

U.S. PATENT DOCUMENTS

| | | | |
|---|---|---|---|
| 2009/0122772 A1* | 5/2009 | Jung | 370/338 |
| 2009/0190501 A1* | 7/2009 | Long | 370/254 |
| 2009/0271517 A1 | 10/2009 | Naylor et al. | |
| 2010/0208658 A1* | 8/2010 | Vesterinen | 370/328 |

FOREIGN PATENT DOCUMENTS

| | | |
|---|---|---|
| CN | 101754187 | 6/2010 |
| EP | 2059079 | 5/2009 |

OTHER PUBLICATIONS

Office Action for Chinese Application No. 201010546362.2, dated Aug. 12, 2013 and English translation provided by ABBYY PDF Transformer 3.0; Google Translate.

* cited by examiner

METHOD AND SYSTEM FOR NETWORK HANDOVER

CROSS-REFERENCE TO RELATED APPLICATIONS

This application is the U.S. National Stage of International Patent Application No. PCT/CN2011/071465, filed on Mar. 2, 2011, which claims priority to Chinese Patent Appl. No. 201010546362.2, filed in the Patent Office of the People's Republic of China on Nov. 15, 2010, the disclosures of which are hereby incorporated by reference in their entireties.

TECHNICAL FIELD

The disclosure relates to the field of communication, and in particular to a method and a system for network handover.

BACKGROUND

At present, in multi-mode wireless terminal equipment, different regions may have different networks. In this case, the equipment judges whether to perform network handover according to currently found network environment. On the premise that the currently found network is superior to the network environment of an original network, the equipment registers to the currently found network automatically which results in that the equipment is disconnected from the original network. The general expression forms include: changing network-connection icons, displaying that the network is disconnected, and simultaneously showing the situations that an Internet Protocol (IP), a subnet, a default gateway and the like are empty. Some operations currently performed, such as downloading, are interrupted to influence the feeling and experience of a user.

Particularly, when the network is instable, for example, in the place where the 3rd-Generation (3G) network coverage signals are poor, the equipment may hand over between the 2nd-generation (2G) network and the 3G network frequently, and the network-connection icons are modified by the system repeatedly, so that the power consumption of the equipment is increased greatly.

An effective solution has not been proposed at present aiming at the problem in a related technology that the power consumption of the equipment is increased greatly because the network-connection icons are modified repeatedly by the system.

SUMMARY

The disclosure provides a method and a system for network handover, which at least solve the problem that the power consumption of the equipment is increased greatly because the network-connection icons are modified repeatedly by the system.

According to one aspect of the disclosure, a method for network handover is provided. The method includes: during a process that equipment hands over from a current network to another network, a driver receiving a network-disconnected message and judging whether the network-disconnected message is sent from a Connection Manager (CM); if the network-disconnected message is sent from the CM, the driver reporting, to an operating system, a first signalling which identifies that the current network is disconnected; and if the network-disconnected message is not sent from the CM, the driver reporting, to the operating system, a second signalling which identifies that the current network is in a connected state.

Preferably, after the driver reports, to the operating system, the first signalling which identifies that the current network is disconnected, the method further includes: the operating system modifying a first icon which identifies that a network is connected into a second icon which identifies that the network is disconnected.

Preferably, after the operating system modifies the first icon which identifies that the network is connected into the second icon which identifies that the network is disconnected, the method further includes: the operating system emptying parameters of an Internet Protocol (IP), a subnet and a default gateway.

Preferably, after the driver reports, to the operating system, the second signalling which identifies that the current network is in the connected state, the method further includes: the operating system continuing displaying a first icon which identifies that a network is connected.

Preferably, after the operating system continues displaying the first icon which identifies that the network is connected, the method further includes: the operating system storing parameters of a current IP, a current subnet and a current default gateway.

Preferably, when the equipment hands over to said another network, the equipment disconnects from the current network, and the driver registers in said another network by using parameter of the current IP.

According to another aspect of the disclosure, a system for network handover is provided, including: equipment, configured to hand over from a current network to another network; and a driver, configured to, during a process that the equipment hands over from the current network to said another network, receive a network-disconnected message and judge whether the network-disconnected message is sent from a Connection Manager (CM); if the network-disconnected message is sent from the CM, report to an operating system a first signalling which identifies that the current network is disconnected; and if the network-disconnected message is not sent from the CM, report to the operating system a second signalling which identifies that the current network is in a connected state.

Preferably, the system further includes: the operating system, configured to modify a first icon which identifies that a network is connected into a second icon which identifies that the network is disconnected after the driver reports, to the operating system, the first signalling which identifies that the current network is disconnected; and continue displaying the first icon which identifies that the network is connected after the driver reports, to the operating system, the second signalling which identifies that the current network is connected.

Preferably, the operating system is further configured to store parameters of a current Internet Protocol (IP), a current subnet and a current default gateway.

Preferably, the equipment is further configured to disconnect from the current network when handing over to said another network; and the driver is further configured to register in said another network by using parameter of the current IP.

In embodiments of the disclosure, the driver judges whether a network-disconnected message is sent from a CM; if the network-disconnected message is sent from the CM, the driver reports, to an operating system, a first signalling which identifies that the current network is disconnected; if the network-disconnected message is not sent from the CM, the driver reports, to the operating system, a second signalling which identifies that the current network is in a connected state. In this way, the operating system is prevented from receiving the network-disconnected message repeatedly and correspondingly modifying a network-connection icon repeatedly, so that the power consumption of the equipment is reduced.

BRIEF DESCRIPTION OF THE DRAWINGS

Drawings, provided for further understanding of the disclosure and forming a part of the specification, are used to explain the disclosure together with embodiments of the disclosure rather than to limit the disclosure, wherein.

DETAILED DESCRIPTION OF THE EMBODIMENTS

The disclosure is described below with reference to the accompanying drawings and embodiments in detail. Note that, the embodiments in the disclosure and the characteristics in the embodiments can be combined mutually if there is no conflict.

Related technologies mention that equipment judges whether to perform network handover according to currently found network environment. On the premise that the currently found network is superior to the network environment of an original network, the equipment registers to the currently found network automatically which results in that the equipment is disconnected from the original network. The general expression forms include: changing network-connection icons, displaying that the network is disconnected, and simultaneously showing the situations that an Internet Protocol (IP), a subnet, a default gateway and the like are empty. Some operations currently performed, such as downloading, are interrupted to influence the feeling and experience of a user. Particularly, when the network is instable, for example, in the place where the 3rd-Generation (3G) network coverage signals are poor, the equipment may hand over between the 2nd-generation (2G) network and the 3G network frequently, and the network-connection icons are modified by the system repeatedly, so that the power consumption of the equipment is increased greatly.

Figure 1:
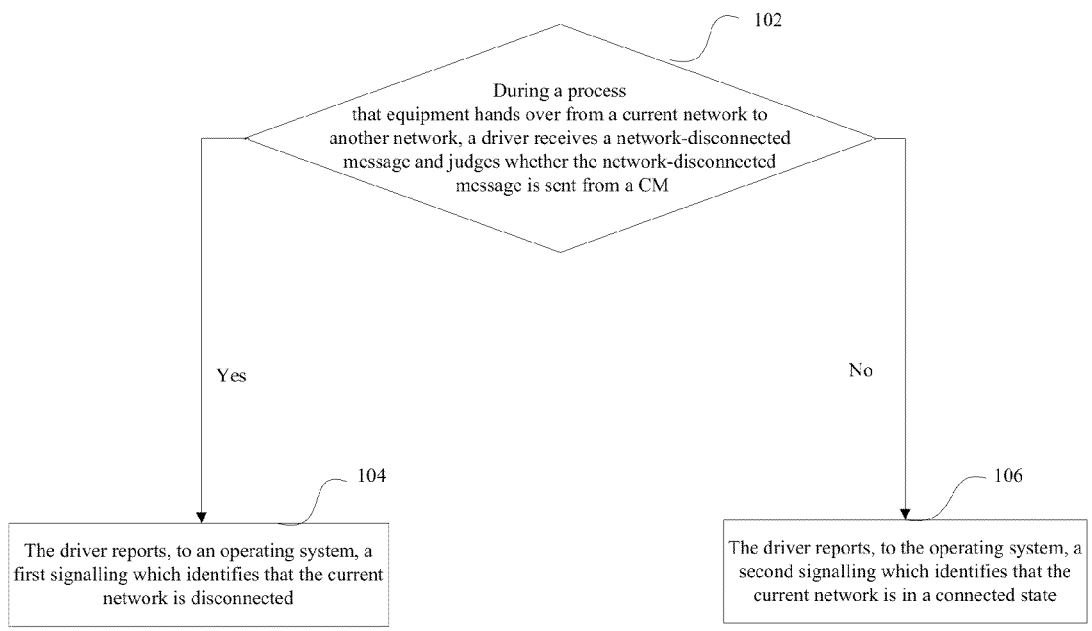
FIG. 1 shows a processing flowchart of a method for network handover according to an embodiment of the disclosure.

In order to solve the above technical problem, an embodiment of the disclosure provides a method for network handover. The processing flow is as shown in FIG. 1 and includes:

Step 102, during a process that equipment hands over from a current network to another network, a driver receives a network-disconnected message and judges whether the network-disconnected message is sent from a Connection Manager (CM); if the network-disconnected message is sent from the CM, the driver executes Step 104; and if the network-disconnected message is not sent from the CM, the driver executes Step 106;

Step 104, the driver reports, to an operating system, a first signalling which identifies that the current network is disconnected; and Step 106, the driver reports, to the operating system, a second signalling which identifies that the current network is in a connected state.

In the embodiment of the disclosure, the driver judges whether a network-disconnected message is sent from a CM; if the network-disconnected message is sent from the CM, the driver reports, to an operating system, a first signalling which identifies that the current network is disconnected; if the network-disconnected message is not sent from the CM, the driver reports, to the operating system, a second signalling which identifies that the current network is in a connected state. In this way, the operating system is prevented from receiving the network-disconnected message repeatedly and correspondingly modifying a network-connection icon repeatedly, so that the power consumption of the equipment is reduced.

In an embodiment, after the driver reports, to the operating system, the first signalling which identifies that the current network is disconnected, the operating system may modify a first icon which identifies that a network is connected into a second icon which identifies that the network is disconnected; and simultaneously, the operating system may empty parameters of an Internet Protocol (IP), a subnet and a default gateway.

During implementation, after the driver reports, to the operating system, the second signalling which identifies that the current network is in the connected state, the operating system may continue displaying a first icon which identifies that a network is connected, and may select to store parameters of a current IP, a current subnet and a current default gateway. In this case, preferably, when the equipment hands over to said another network, the equipment disconnects from the current network, and the driver registers in said another network by using the parameter of the current IP.

In the embodiments of the disclosure, when multi-mode wireless terminal equipment is in different regions, after the equipment performs the network handover automatically, a network-connection icon in the current Windows shows the state of normal connection all the time; moreover, after connecting to another network, the equipment continues performing the current downloading. After the technical solution is realized, a user does not feel the network disconnection after the network handover is performed automatically, so that the feeling and experience of the user is improved; and simultaneously, the requirements of part operators are met.

The disclosure is described in detail below by several embodiments.

First Embodiment

The network environment and the equipment involved in the embodiment are classified according to four modules of User Identification (UI) application software, a driver, equipment and a network as follows.

The UI application software refers to various application programs installed in an operating system generally, preferably, refers to an application program used for operating wireless equipment.

A Network Intrusion Detection System (Nids) driver refers to a Nids drive program which preserves IP information of the network.

The equipment refers to a wireless data card.

The network refers to the set of different types of networks, such as China Mobile, China Unicom, Evolution Data Only (EVDO, namely a stage of a 3G system), and Worldwide Interoperability for Microwave Access (WiMAX).

Through the application program, related operation, such as the network operation of surfing the Internet and downloading, of the network can be performed. The application program transmits these commands to the Nids driver through related protocols. The Nids driver analyzes transmitted data into a corresponding command according to the transmitted data and applicable protocols, and sends the corresponding command to the equipment, so that the equipment performs the corresponding operation, and therefore connects to different networks. However, after the equipment connects to a certain network A, for some reason, the network A has no signal in the current region, or the signal is poor, while the signal of another network B in the region is very good. At this time, the equipment hands over to the network B and disconnects from the current network A. During the process of disconnecting from the network A and connecting to the network B, the equipment gives corresponding return information to the Nids driver, so that the Nids driver can return the current network state and network information to the operating system correctly. In the embodiment, when the related network information returned to the Nids driver by the equipment is received, whether the information is required to be reported correctly is determined by judging whether the network-disconnected message is sent by the CM.

If the network-disconnected message is sent by the CM, the Nids driver reports, to the system, a first signaling which identifies that the current network is disconnected. Simultaneously, the system displays a network-connection icon into a network-disconnected state, moreover, the parameters of the IP, the subnet, the default gateway and the like are set to be empty. If the received signaling is a network-disconnected message which is not from the CM, the driver reports a false message to the system, namely a second signaling which identifies that the current network is connected, which shows that the network is normal. After receiving the signaling, the operating system can continuously display that the network connection is normal, and simultaneously preserves the parameters of the IP, the subnet and the default gateway. At the time, the equipment has been disconnected from the network actually, the state that the network-connection is normal is still displayed at the position of the network disconnection of the operating system; simultaneously, the parameters of the current IP, the current subnet and the current default gateway are stored. Moreover, the operation, such as uploading, downloading and the like, related to the network can be maintained. After the equipment automatically hands over to another network, the Nids driver re-registers to a network by using the preserved parameters of the IP, and continues performing the previous operation related to the network. Simultaneously, the previous network can be disconnected by the application program so as to finish the network handover.

In the embodiment of the disclosure, an Application Program Interface (API) in the Nids drive program provides an API interface for the interaction between the driver and the application programs. By parameter setting in the API interface, the related information can be sent to the driver by the application program; and moreover, a corresponding result also can be returned to the application program.

During implementation, the module of the interface of the operating system provides functions related to the interaction with the operating system. The functions can inform the operating system of the related information, for example, the functions for reporting the normal network state of the operating system in the embodiment.

A system monitoring module provides the related information returned from the operating system or the equipment. In the embodiment, which signaling is reported to the operating system is judged through the related network information returned by detection equipment.

The system monitors and detects the information returned by the equipment, extracts the related information and judges whether the information is required to be reported to the operating system according to the information. At the time, the network-disconnected message sent by the equipment is modified into the normal network state; the normal network state is reported to the operating system through the system interface, so that the operating system can display the current state correctly and simultaneously wait to access another network. After another network is accessed, the API interface function can be called through the UI application program to send the true network-disconnected message to the Nids drive program, so that the drive program calls the system interface to send the network-disconnected message to the system, the disconnected network of the equipment is disconnected, and a new network is used.

Second Embodiment

Figure 2:
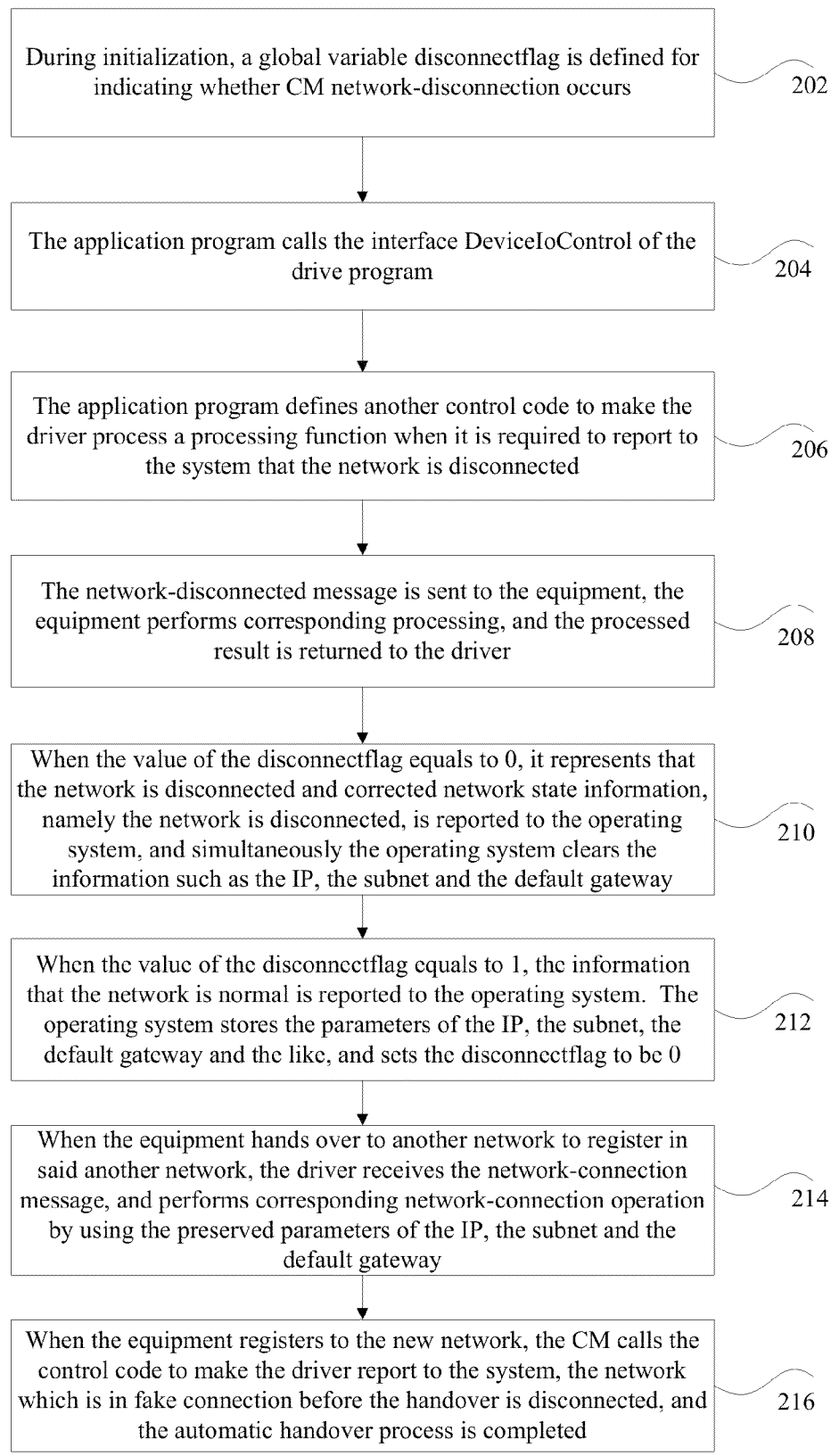
FIG. 2 shows a flowchart of keeping a network-connected state during network handover according to an embodiment of the disclosure.

The embodiment provides a flow of keeping the network-connected state during network handover, specifically referring to the schematic diagram as shown in FIG. 2.

Step 202, during initialization, a global variable disconnectflag is defined for indicating whether CM network-disconnection occurs, wherein the disconnectflag being 0 indicates that the CM network-disconnection occurs, the disconnectflag being 1 indicates that the CM maintains a fake network-connected state, and the initial value of the disconnectflag is 0.

Step 204, when the application program calls the interface DeviceIoControl of the drive program to interact a function with the driver, in the application software and the drive program, a control code, which is used for controlling the disconnectflag, with an input argument is customized. The driver needs to set the disconnectflag of the CM to be 1 under the condition corresponding to the control code. When a fake network-connected state needs to be maintained after the network is disconnected, before the CM sends the network-disconnected message, the customized control code is sent first, so that the driver sets the disconnectflag to be 1.

Step 206, the application program defines another control code to make the driver process a processing function when it is required to report to the system that the network is disconnected.

Step 208, the network-disconnected message is sent to the equipment, the equipment performs corresponding processing, and the processed result is returned to the driver. When the network-disconnected message from the equipment is received, whether the disconnectflag expresses that the network is disconnected or the CM maintains network connection (namely, the value of the disconnectflag is 1 or 0) is judged with reference to the customized global variable disconnectflag.

Step 210, when the value of the disconnectflag equals to 0, it represents that the network is disconnected and corrected network state information, namely the network is disconnected, is reported to the operating system, and simultaneously the operating system clears the information such as the IP, the subnet and the default gateway.

Step 212, when the value of the disconnectflag equals to 1, the information that the network is normal is reported to the operating system. The operating system stores the parameters of the IP, the subnet, the default gateway and the like, and sets the disconnectflag to be 0.

Step 214, when the equipment hands over to another network to register in said another network, the driver receives the network-connection message, and performs corresponding network-connection operation by using the preserved parameters of the IP, the subnet and the default gateway.

Step 216, when the equipment registers to the new network, the CM calls the control code to make the driver report to the system, the network which is in fake connection before the handover is disconnected, and the automatic handover process is completed.

Figure 3:
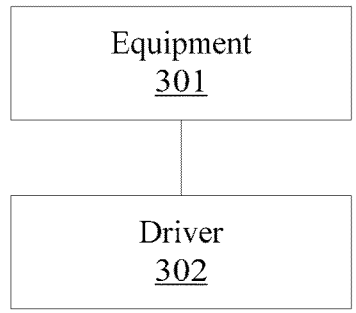
FIG. 3 shows a first structural schematic diagram of a system for network handover according to an embodiment of the disclosure.

On the basis of the same conception, an embodiment of the disclosure also provides a system for the network handover. The structural schematic diagram of the system is as shown in FIG. 3. The system for network handover includes:

equipment 301, configured to hand over from a current network to another network; and a driver 302, configured to receive a network-disconnected message and judge whether the network-disconnected message is sent from a CM during a process that the equipment 301 hands over from the current network to said another network; if the network-disconnected message is sent from the CM, report, to an operating system, a first signalling which identifies that the current network is disconnected; and if the network-disconnected message is not sent from the CM, report, to the operating system, the second signalling which identifies that the current network is in a connected state.

Figure 4:
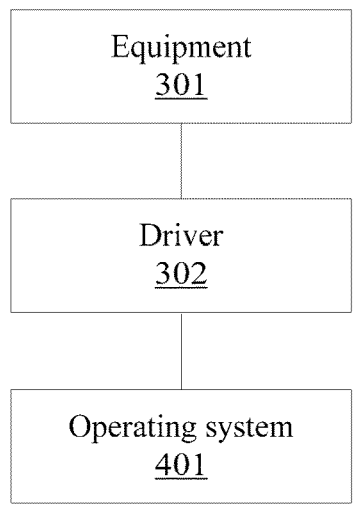
FIG. 4 shows a second structural schematic diagram of a system for network handover according to an embodiment of the disclosure.

In one embodiment, as shown in FIG. 4, the system for network handover further includes:

the operating system 401, configured to modify a first icon which identifies that the network is connected into a second icon which identifies that the network is disconnected after the driver 302 reports, to the operating system, the first signalling which identifies that the current network is disconnected, and continue displaying the first icon which identifies that the network is connected after the driver 302 reports, to the operating system, the second signalling which identifies that the current network is connected.

In one embodiment, the operating system 401 may be further configured to store parameters of a current IP, a current subnet and a current default gateway.

In one embodiment, the equipment 301 may be further configured to disconnect from the current network when the equipment 301 hands over to said another network; and the driver 302 may be further configured to register in said another network by using the parameter of the current IP.

It can be seen from the above description that the following technical effects are achieved by the disclosure.

In embodiments of the disclosure, the driver judges whether a network-disconnected message is sent from a CM; if the network-disconnected message is sent from the CM, the driver reports, to an operating system, a first signalling which identifies that the current network is disconnected; if the network-disconnected message is not sent from the CM, the driver reports, to the operating system, a second signalling which identifies that the current network is in a connected state. In this way, the operating system is prevented from receiving the network-disconnected message repeatedly and correspondingly modifying a network-connection icon repeatedly, so that the power consumption of the equipment is reduced. Moreover, in the embodiments of the disclosure, when the equipment performs the handover and when the network is handed over, the system displays that the icon of the network state and the information of all of the IP, the subnet and the default gateway are not changed, which guarantees better feeling of the user in downloading and experience.

Obviously, those skilled in the art shall understand that the above-mentioned modules and steps of the disclosure can be realized by using general purpose calculating device, can be integrated in one calculating device or distributed on a network which consists of a plurality of calculating devices. Alternatively, the modules and the steps of the disclosure can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the disclosure is not restricted to any particular hardware and software combination.

The descriptions above are only the preferable embodiment of the disclosure, which are not used to restrict the disclosure. For those skilled in the art, the disclosure may have various changes and variations. Any amendments, equivalent substitutions, improvements, etc. within the principle of the disclosure are all included in the scope of the protection of the disclosure.

What is claimed is:

1. A method for network handover, comprising:
during a process that equipment hands over from a current network to another network, a driver receiving a network-disconnected message and judging whether the network-disconnected message is sent from a Connection Manager (CM), wherein, before judging whether the network-disconnected message is sent from a Connection Manager (CM), a global variable disconnectflag is defined for indicating whether CM network-disconnection occurs;
if the value of the disconnectflag indicates that the CM network-disconnection occurs and the network-disconnected message is sent from the CM, the driver reporting, to an operating system, a first signalling which identifies that the current network is disconnected; and
if the value of the disconnectflag indicates that the CM network-disconnection does not occur and the network-disconnected message is not sent from the CM, the driver reporting, to the operating system, a second signalling which identifies that the current network is in a connected state.

2. The method according to claim 1, wherein after the driver reports, to the operating system, the first signalling which identifies that the current network is disconnected, the method further comprises: the operating system modifying a first icon which identifies that a network is connected into a second icon which identifies that the network is disconnected.

3. The method according to claim 2, wherein after the operating system modifies the first icon which identifies that the network is connected into the second icon which identifies that the network is disconnected, the method further comprises: the operating system emptying parameters of an Internet Protocol (IP), a subnet and a default gateway.

4. The method according to claim 1, wherein after the driver reports, to the operating system, the second signalling which identifies that the current network is in the connected state, the method further comprises: the operating system continuing displaying a first icon which identifies that a network is connected.

5. The method according to claim 2, wherein after the operating system continues displaying the first icon which identifies that the network is connected, the method further comprises: the operating system storing parameters of a current IP, a current subnet and a current default gateway.

6. The method according to claim 5, wherein when the equipment hands over to said another network, the equipment disconnects from the current network, and the driver registers in said another network by using parameter of the current IP.

7. A system for network handover, comprising:
equipment, configured to hand over from a current network to another network; and
a driver, configured to, during a process that the equipment hands over from the current network to said another network, receive a network-disconnected message and judge whether the network-disconnected message is sent from a Connection Manager (CM), wherein, before judging whether the network-disconnected message is sent from a Connection Manager (CM), a global variable disconnectflag is defined for indicating whether CM network-disconnection occurs; if the value of the disconnectflag indicates that the CM network-disconnection occurs and the network-disconnected message is sent from the CM, report to an operating system a first signalling which identifies that the current network is disconnected; and if the value of the disconnectflag indicates that the CM network-disconnection does not occur and the network-disconnected message is not sent from the CM, report to the operating system a second signalling which identifies that the current network is in a connected state.

8. The system according to claim 7, further comprising:
the operating system, configured to modify a first icon which identifies that a network is connected into a second icon which identifies that the network is disconnected after the driver reports, to the operating system, the first signalling which identifies that the current network is disconnected; and continue displaying the first icon which identifies that the network is connected after the driver reports, to the operating system, the second signalling which identifies that the current network is connected.

9. The system according to claim 8, wherein the operating system is further configured to store parameters of a current Internet Protocol (IP), a current subnet and a current default gateway.

10. The system according to claim 8, wherein the equipment is further configured to disconnect from the current network when handing over to said another network; and
the driver is further configured to register in said another network by using parameter of the current IP.

11. The system according to claim 9, wherein the equipment is further configured to disconnect from the current network when handing over to said another network; and
the driver is further configured to register in said another network by using parameter of the current IP.

* * * * *